United States Patent [19]

Aldrich

[11] 4,296,723

[45] Oct. 27, 1981

[54] ENGINE FUEL SYSTEM WITH FUEL/WATER SEPARATION

[75] Inventor: Frederic C. Aldrich, Lansing, Mich.

[73] Assignee: General Motors Corporation, Detroit, Mich.

[21] Appl. No.: 104,308

[22] Filed: Dec. 17, 1979

[51] Int. Cl.[3] ...................... F02M 55/00; B01D 17/00

[52] U.S. Cl. .................................... 123/510; 123/514; 123/25 R; 210/DIG. 5; 137/558; 137/565

[58] Field of Search ..................... 123/25 R, 510, 514; 210/DIG. 5, 172, 167, 114; 137/558, 565

[56] References Cited

U.S. PATENT DOCUMENTS

| | | | |
|---|---|---|---|
| 3,279,380 | 10/1966 | Clark | 137/558 |
| 3,297,161 | 1/1967 | Kasten | 210/DIG. 5 |
| 3,872,886 | 3/1975 | Shotmeyer | 137/558 |

*Primary Examiner*—Charles J. Myhre
*Assistant Examiner*—Carl Stuart Miller
*Attorney, Agent, or Firm*—D. D. McGraw

[57] ABSTRACT

The system includes a fuel storage tank connected to a vacuum pump by a supply line, a fuel/water separator, a fuel lift pump, a fuel/water return line and a fuel injector pump or carburetor. The fuel/water separator includes a coalescer interposed between the fuel lift pump and the injector pump or carburetor to separate the water from the fuel. Water collects in the lowest portion of the separator housing, is removed through an orifice in the fuel/water return line, and is routed back to the fuel tank. With moderate levels of water contamination in the fuel tank the system prevents water from reaching the fuel injector pump or carburetor for an indefinite period of time. The separator housing is constantly drained since the separator is under pressure. The system has a suitable detector to detect the water level in the fuel storage tank. Water may be removed from the fuel storage tank by temporarily converting a part of the water/fuel return line to a water outlet pumping line through a three-way valve.

1 Claim, 1 Drawing Figure

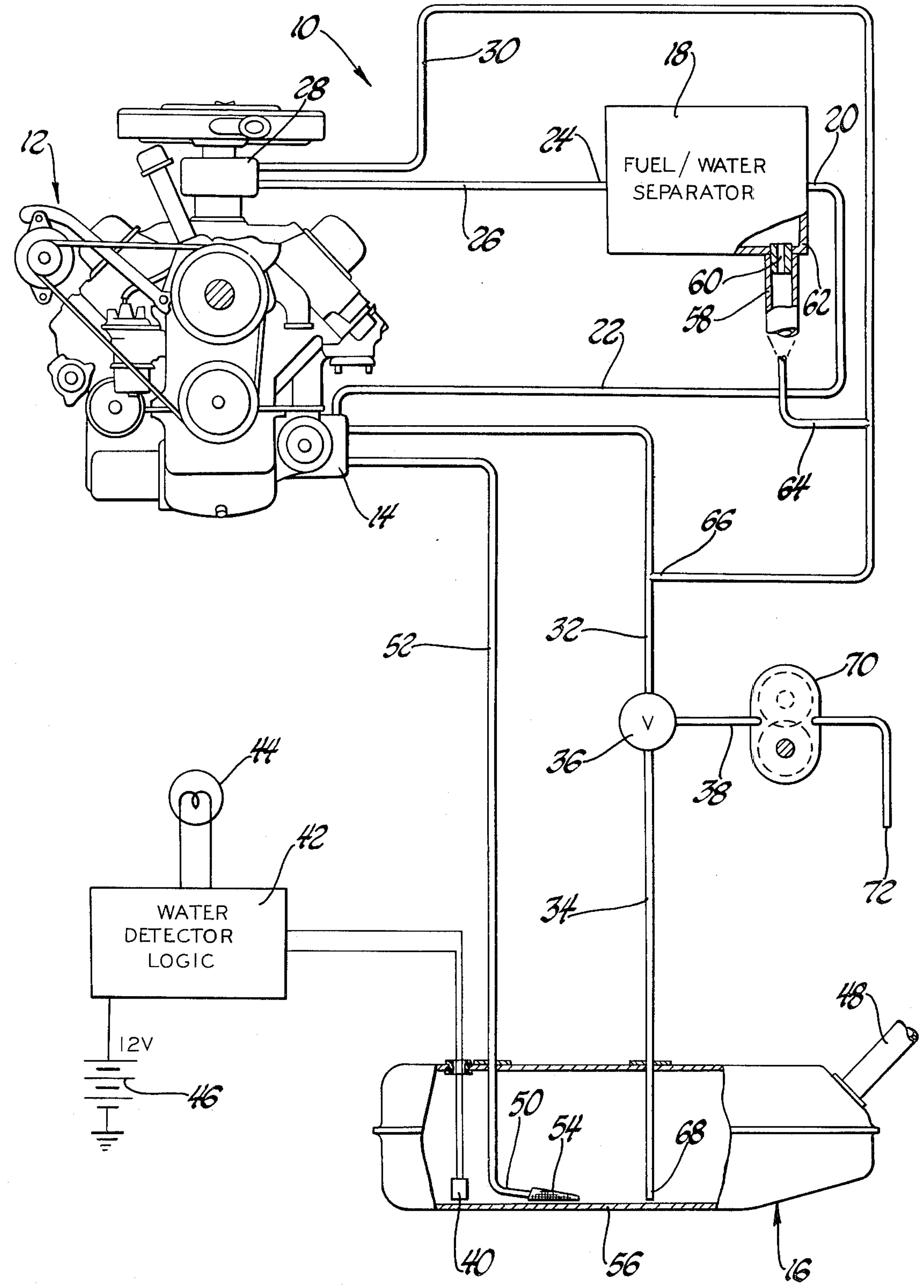
10
30
18
28
12
24
FUEL / WATER SEPARATOR
20
26
60
62
58
22
64
14
66
52
32
70
36
38
44
72
42
34
WATER DETECTOR LOGIC
48
12V
46
50
54
68
40
56
16

ENGINE FUEL SYSTEM WITH FUEL/WATER SEPARATION

The invention relates to a liquid fuel internal combustion engine fuel system having an arrangement for separating water from the fuel, returning the water to the fuel storage tank, and for removing water from the fuel storage tank when sufficient water warranting such removal has accumulated there. It is a feature of the invention that the fuel/water separator is on the pressure side of the fuel pump so that the water separated therein is removed from the separator housing through an orifice by the pressure of the fuel pump. The water and any fuel which may also be present are returned to the storage tank through an excess fuel return line. The system embodying the invention preferably uses a water level detector which will indicate to the engine operator when sufficient water has accumulated in the fuel storage tank to be removed therefrom.

IN THE DRAWING

The single FIGURE schematically represents the system embodying the invention, with parts broken away and in section.

The system 10 embodying the invention is schematically illustrated as including an internal combustion engine 12 which is of a type utilizing liquid fuel such as gasoline or diesel fuel. The fuel may be supplied to the engine by carburetion or fuel injection or other suitable means as appropriate. The engine 12 is illustrated as including a fuel pump 14 driven by the engine and arranged to lift the fuel from a fuel storage tank 16 and deliver the fuel under pressure for use in the engine 12. A fuel/water separator 18 is provided with an inlet 20 receiving pressurized fuel from fuel pump 14 through conduit 22. Separator 18 is provided with an outlet 24 connected to the engine 12 by conduit 26.

The particular engine illustrated in the drawing has a fuel injection mechanism 28 receiving the pressurized fuel through conduit 26 and returning unused excess fuel through conduit 30 to the fuel storage tank 16 via a portion of conduit 32 and conduit 34. A three-way valve 36 has two of its ports respectively connecting with conduit 32 and conduit 34 and its third port connecting with conduit 38. The valve may be positioned to close the connection to conduit 38 and open the connection between conduits 32 and 34 so that the excess fuel is returned to tank 16. As will be later described, the valve may also be positioned to close conduit 32 while connecting conduits 34 and 38.

The system 10 also includes a water detector 40 within the fuel storage tank 16, the detector being connected to suitable water detector logic 42 so that when a predetermined amount of water is detected in tank 16 by detector 40 an indicator 44 is energized. The indicator may be of any suitable type which will provide information to the engine operator and is illustrated schematically as being a lamp. The battery 46 is schematically illustrated as being connected to supply necessary electrical energy for operation of the water detector, the logic device 42 and the indicator 44.

Fuel storage tank 16 is illustrated as being of the type usually employed in a motor vehicle such as an automobile, bus or truck. The tank has a fuel inlet 48 providing for intermittent replenishment of fuel as the fuel in the tank is consumed. The tank has a fuel outlet 50 which connects to a conduit 52 leading to the inlet side of fuel pump 14. Fuel outlet 50 is schematically illustrated as having a fuel pick-up 54 positioned near the bottom 56 of tank 16 and fitted with a Saran sock which prevents some water in the tank from being picked up by the outlet and passing through the fuel pump 14.

The separator 18 has an outlet 58 at the bottom of the separator housing 62, the outlet 58 being provided with an orifice 60 to limit the flow therethrough to a relatively small rate in comparison to the flow rate of the fuel and any water entrained in the fuel which enters inlet 20. The separator has a suitable coalescer which separates the water from the fuel entering through inlet 20 and permits the cleansed fuel to be delivered through outlet 24 and conduit 26 to the engine. The water so separated collects in the bottom of the separator housing 62. Since the fuel pump 14 is pumping pressurized fuel through the separator 18, the interior of the separator housing is under pressure. This pressure assists in forcing water from the separator housing through orifice 16 to outlet 58. Outlet 58 is connected to a conduit 64 which is in turn connected to the fuel return conduit 30. Conduit 30 is connected at 66 with conduit 32. Therefore any water from separator 18 passes through outlet 58, conduit 64, conduit 30, conduit 32, valve 36, and conduit 34 to the fuel return inlet 68 of storage tank 16. Inlet 68 is positioned immediately adjacent the bottom 56 of tank 16 so that the excess fuel, and any water returned from separator 18 to the tank through inlet 68, is discharged near the tank bottom. Since the fuel return inlet 68 is also used, as described below, for water removal, it must be located near the bottom 56 of tank 16.

A pump 70 may be either a permanently installed part of the system or may be a portable pump of suitable type which can be connected to conduit 38. Conduit 38 therefore becomes an inlet for pump 70 when so connected. The pump is illustrated as having an outlet 72 which may be led to a suitable container for use when water is being pumped out of tank 16.

When the water detector indicator 44 is energized, the engine operator should shortly thereafter remove the excess water from storage tank 16. This is accomplished by operating three-way valve 36 so that conduit 32 is closed and conduits 34 and 38 are connected through the valve. Pump 70 is connected to conduit 38 and pump outlet 72 is suitably positioned for disposal of the water to be removed. Pump 70 is then energized, lifting water from the bottom of storage tank 16 through the fuel return inlet 68, conduit 34, valve 36 and conduit 38, discharging the water to the outlet 72. By careful observation, the pump 70 may be deenergized when fuel begins to be delivered through outlet 72, indicating that the water has been removed. If desired, the operation of valve 36 and pump 70 may be coordinated with the water detector logic 42 to operate automatically, removing sufficient water from the bottom of storage tank 16 so that the water detector 40 no longer detects water in the tank. The logic 42 could then deenergize pump 70 and return valve 36 to the position wherein conduit 38 is closed and conduits 32 and 34 are once again connected.

The system provides for separation of fuel and water under pressure, the pressurized return of the separated water to the fuel storage tank, the sensing of sufficient water in the storage tank to warrant its removal, and mechanism for removing the water from the storage tank.

The embodiments of the invention in which an exclusive property or privilege is claimed are defined as follows:

1. A liquid fuel supply system for an engine in which the fuel may have some water entrained therein which should be removed before the fuel is used in the engine, said system comprising:

a fuel storage tank having a fuel inlet, a fuel outlet, a return inlet and means for detecting a predetermined level of water in the tank and alerting the engine operator that the predetermined water level has been reached;

a fuel pump connected with said fuel outlet to receive fuel from said tank and when operating pressurizing the fuel so received;

a fuel/water separator having an inlet receiving pressurized fuel from said fuel pump, means separating the fuel and any water entrained in the fuel received from the fuel pump, a first outlet delivering pressurized fuel from said separating means to said engine for use therein, a second outlet including orifice means receiving water from said separating means, said second outlet being connected to said tank return inlet for returning pressurized separated water to said tank;

said separated water being retained in said tank and activating said detecting and alerting means when said predetermined water level in said tank is reached;

and means for removing water from said tank.

* * * * *

UNITED STATES PATENT AND TRADEMARK OFFICE

CERTIFICATE OF CORRECTION

PATENT NO. : 4,296,723

DATED : October 27, 1981

INVENTOR(S) : Fredric C. Aldrich

It is certified that error appears in the above—identified patent and that said Letters Patent is hereby corrected as shown below:

Title page, Item [75], "Frederic C. Aldrich" should read -- Fredric C. Aldrich --.

Signed and Sealed this

*Ninth* Day of *March 1982*

[SEAL]

*Attest:*

GERALD J. MOSSINGHOFF

*Attesting Officer* *Commissioner of Patents and Trademarks*